(12) United States Patent
Johnson

(10) Patent No.: US 10,476,948 B2
(45) Date of Patent: Nov. 12, 2019

(54) SERVICE LOCATION MANAGEMENT IN COMPUTING SYSTEMS

(71) Applicant: Microsoft Technology Licensing, LLC, Redmond, WA (US)

(72) Inventor: James Johnson, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 124 days.

(21) Appl. No.: 15/272,275

(22) Filed: Sep. 21, 2016

(65) Prior Publication Data
US 2018/0084038 A1   Mar. 22, 2018

(51) Int. Cl.
*H04L 29/08* (2006.01)
*H04L 29/14* (2006.01)
*G06F 9/50* (2006.01)

(52) U.S. Cl.
CPC ........ *H04L 67/1023* (2013.01); *G06F 9/5072* (2013.01); *H04L 67/10* (2013.01);
(Continued)

(58) Field of Classification Search
CPC ....... H04L 67/10; H04L 41/12; H04L 41/145; H04L 41/0893; H04L 41/5096; H04L 67/16; H04L 67/1097; H04L 67/1095; H04L 43/10; H04L 67/306; H04L 67/26; H04L 12/14; H04L 41/046; H04L 41/0659; H04L 43/0817; H04L 43/12; H04L 51/22;
(Continued)

(56) References Cited

U.S. PATENT DOCUMENTS 8,549,066 B1   10/2013   Donahue et al.
8,726,264 B1   5/2014   Allen et al.
(Continued)

FOREIGN PATENT DOCUMENTS

WO   2014065722 A1   5/2014
WO   2015119638 A1   8/2015
(Continued)

OTHER PUBLICATIONS

"International Search Report and Written Opinion Issued in PCT Application No. PCT/US2017/051432", dated Dec. 12, 2017, 13 Pages.

*Primary Examiner* — Djenane M Bayard
(74) *Attorney, Agent, or Firm* — Liang IP, PLLC

(57) ABSTRACT

Techniques for facilitating allocation of cloud services in cloud computing systems are disclosed herein. In one embodiment, a method can include transmitting a request to service controllers configured to manage corresponding cloud services deployable in the cloud computing system, the request including a set of cloud services to be deployed in the cloud computing system. The method can also include receiving, from each of the service controllers, a list of at least some of the computing facilities arranged in order of preference for deploying one or more corresponding cloud services. The method can further includes selecting one of the computing facilities from the multiple computing facilities for deploying the set of cloud services based on the preferences of the service controllers reflected in the received lists and instructing the service controllers to deploy the one or more corresponding cloud services to the selected one of the computing facilities.

20 Claims, 13 Drawing Sheets

(52) U.S. Cl.
CPC .......... *H04L 67/1021* (2013.01); *H04L 67/18* (2013.01); *H04L 67/327* (2013.01); *H04L 69/40* (2013.01)

(58) Field of Classification Search
CPC ..... H04L 63/08; H04L 63/1416; H04L 67/02; H04L 67/18; H04L 47/70; H04L 49/552; H04L 51/046; H04L 51/10; H04L 51/32; H04L 63/00; H04L 63/0236; H04L 63/062; H04L 63/0853; H04L 63/0876; H04L 63/0892; H04L 63/104; H04L 63/145; H04L 63/20; H04L 65/1036; G06F 9/5072; G06F 9/45558; G06F 8/60
See application file for complete search history.

(56) References Cited

U.S. PATENT DOCUMENTS

| | | | |
|---|---|---|---|
| 8,984,162 | B1 | 3/2015 | Allen et al. |
| 9,229,740 | B1 | 1/2016 | Allen et al. |
| 2011/0314082 | A1* | 12/2011 | Koneti ............... G06F 9/5055 709/203 |
| 2012/0137003 | A1* | 5/2012 | Ferris ............... H04W 4/003 709/226 |
| 2013/0080509 | A1* | 3/2013 | Wang ............... H04L 12/66 709/203 |
| 2014/0006480 | A1* | 1/2014 | Dobrev ............... H04L 67/42 709/203 |
| 2014/0033268 | A1 | 1/2014 | Julisch et al. |
| 2014/0074905 | A1* | 3/2014 | Schincariol ............. H04L 67/10 709/201 |
| 2014/0173594 | A1* | 6/2014 | Ng ............... G06F 9/45533 718/1 |
| 2014/0279201 | A1 | 9/2014 | Iyoob et al. |
| 2014/0280595 | A1* | 9/2014 | Mani ............... H04L 12/1827 709/204 |
| 2014/0366155 | A1 | 12/2014 | Chang et al. |
| 2015/0341240 | A1 | 11/2015 | Iyoob et al. |
| 2016/0019636 | A1* | 1/2016 | Adapalli ............... G06Q 30/0641 705/26.62 |
| 2016/0034292 | A1* | 2/2016 | Cao ............... G06F 9/45558 718/1 |
| 2016/0094483 | A1 | 3/2016 | Johnston et al. |
| 2016/0205037 | A1* | 7/2016 | Gupte ............... H04L 67/10 709/226 |
| 2016/0241446 | A1* | 8/2016 | Gupte ............... H04L 41/5096 |
| 2017/0024234 | A1* | 1/2017 | Wu ............... G06F 9/45558 |
| 2017/0063615 | A1* | 3/2017 | Yang ............... H04L 41/0806 |

FOREIGN PATENT DOCUMENTS

| | | |
|---|---|---|
| WO | 2016022908 A1 | 2/2016 |
| WO | 2016053301 A1 | 4/2016 |

* cited by examiner

SERVICE LOCATION MANAGEMENT IN COMPUTING SYSTEMS

BACKGROUND

Remote or "cloud" computing typically utilizes a collection of remote servers in datacenters to provide computing, data storage, electronic communications, or other cloud services. The remote servers can be interconnected by computer networks to form a computing fabric organized as one or more computing clusters. During operation, multiple remote servers or computing clusters can cooperate to provide a distributed computing environment that facilitates execution of user applications to provide cloud services.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Certain cloud services prefer to be physically close to one another due to communication latency, performance, or other suitable considerations. For example, two virtual machines would prefer to be close by to exchange data for processing. Such placement preferences are typically associated with a common service controller managing similar services. For instance, an application that deploys two virtual machines can specify that the two virtual machines be hosted on a single server, within a particular network delay distance, or in a single failure domain. A virtual machine controller can then allocate and deploy the virtual machines according to the specification of the application.

The foregoing controller-based deployment management, however, can have limited effectiveness when handling certain applications with dissimilar services that are managed in by different controllers. For example, an application can include a set of virtual machines with associated storage services, database services, and/or other suitable types of cloud services. The dissimilar services can prefer to be physically close to one another but typically do not share a common service controller. Instead, each type of services is placed by one or more corresponding service controllers. As such, facilitating placement affinity in a collection of dissimilar services can be a challenge for cloud service providers.

Several embodiments of the disclosed technology are directed to techniques in allocating dissimilar services as a collection to computing facilities so that the dissimilar services can be physically close to one another. The collection of dissimilar services can also be moved as a group during a regional or facility-level failover, and can be subsequently restored to an original computing facility after failure is repaired. In certain implementations, an application can declaratively specify a collection of cloud services of different types. Each specified cloud service can be managed by a corresponding service controller.

The service controllers can then participate in a process to determine a location (e.g., one or more computing facilities) for deploying or moving the collection of cloud services as a group based on collective preferences of the service controllers. For instance, the service controllers can be aware that certain computing facilities, e.g. datacenters designated as DC1, DC2, DC3, are available for deploying the cloud services. The service controllers can also understand that all cloud services deployed in a single computing facility (or a group of computing facilities) are physically close. Given the list of possible computing facilities, a management service can query the service controllers for a list of possible locations that each service controller prefers. The service controllers can rank the list in order of preference based on, for example, available capacities, configuration suitability, specified co-location constraints of the cloud services, or other suitable considerations. Once the management service receives the lists from the service controllers, the management service can derive an overall preference for the collection of services based on the received lists of possible locations. The management service can then send a placement restriction to each service controller for limiting allocation of the corresponding services to one or more of the computing facilities.

In certain implementations, the management service can assign certain values to each possible computing facility based on corresponding ranking and sum the assigned values for individual computing facilities to derive an overall preference facility. In one example, first, second, and third controllers can provide the lists of possible locations as follows:

DC1, DC3, DC2
DC2, DC3, DC1
DC1, DC2, DC3.

If the management service assigns values of 3, 2, and 1 to number one, two, and three choices, respectively, DC1, DC2, DC3 would have total values of 7, 6, and 5, respectively. As such, the management service can select DC1 as the overall preference.

In other implementations, the management service can also filter the possible facilities to derive a set of facilities that all service controllers can accept before applying the foregoing value assignment. In the example above, if the second service controller cannot accept DC1, then DC2 would be the overall preference. In yet further implementations, the management service can apply weighting factors to further adjust balancing when selecting an overall preference. For instance, the management service can apply a weighting factor of greater than one to a list from a particular service controller such that a choice by that service controller would outweigh choices of the same ranking by other service controllers. In yet further implementations, the management service can also apply different value assignment schemes or other suitable techniques to achieve desired balancing in selecting the overall preference.

When a deployed service encounters outage, failure, or other operational issues, a service controller managing the deployed service can request the management service to conduct another process to determine a new overall preference facility. In response, the management service can repeat the foregoing process based on new lists of possible computing facilities from at least one of the service controllers. For instance, in the example above, if the third service controller discovers that a managed service can no longer be functioning properly in DC2, the third service controller can request the management service to repeat the location determination process. The third service controller can specify a new list, for example, DC1, DC3. Based on the new list and lists from the first and second controllers, the management service can select DC3 as the new overall preference and instruct the first, second, and third controllers to move or migrate corresponding cloud services to DC3 from DC2. When DC2 later becomes available again, the management service can repeat the process again and can possibly decide to move all services back to DC2.

In other implementations, the application can also specify degrees to which the cloud services are to be located close to one another (referred to as "co-location constraints"), and a degree to which such co-location constraints can be relaxed. This allows the management service to approve decisions or restrictions that not all service controllers can agree upon. For instance, with the example above, if co-location of services managed by the first and third controllers is more important than those managed by the second controller, the management service can decide that DC1 is the overall preference for the first service controller and the third controller, but DC2 is the overall preference for the second controller.

By implementing the foregoing location determination processes, several embodiments of the disclosed technology can improve efficiencies in deployment of cloud services of an application in cloud computing systems. By allowing the service controllers to propose preferred locations based on location and/or cloud service characteristics, the management service can derive an overall preference for all of the cloud services. Deploying the cloud services to the overall preference location based on co-location constraints related to the application can at least reduce risks of performance degradation or outage due to latency or other operational issues in cloud computing systems.

DETAILED DESCRIPTION

Figure 1:
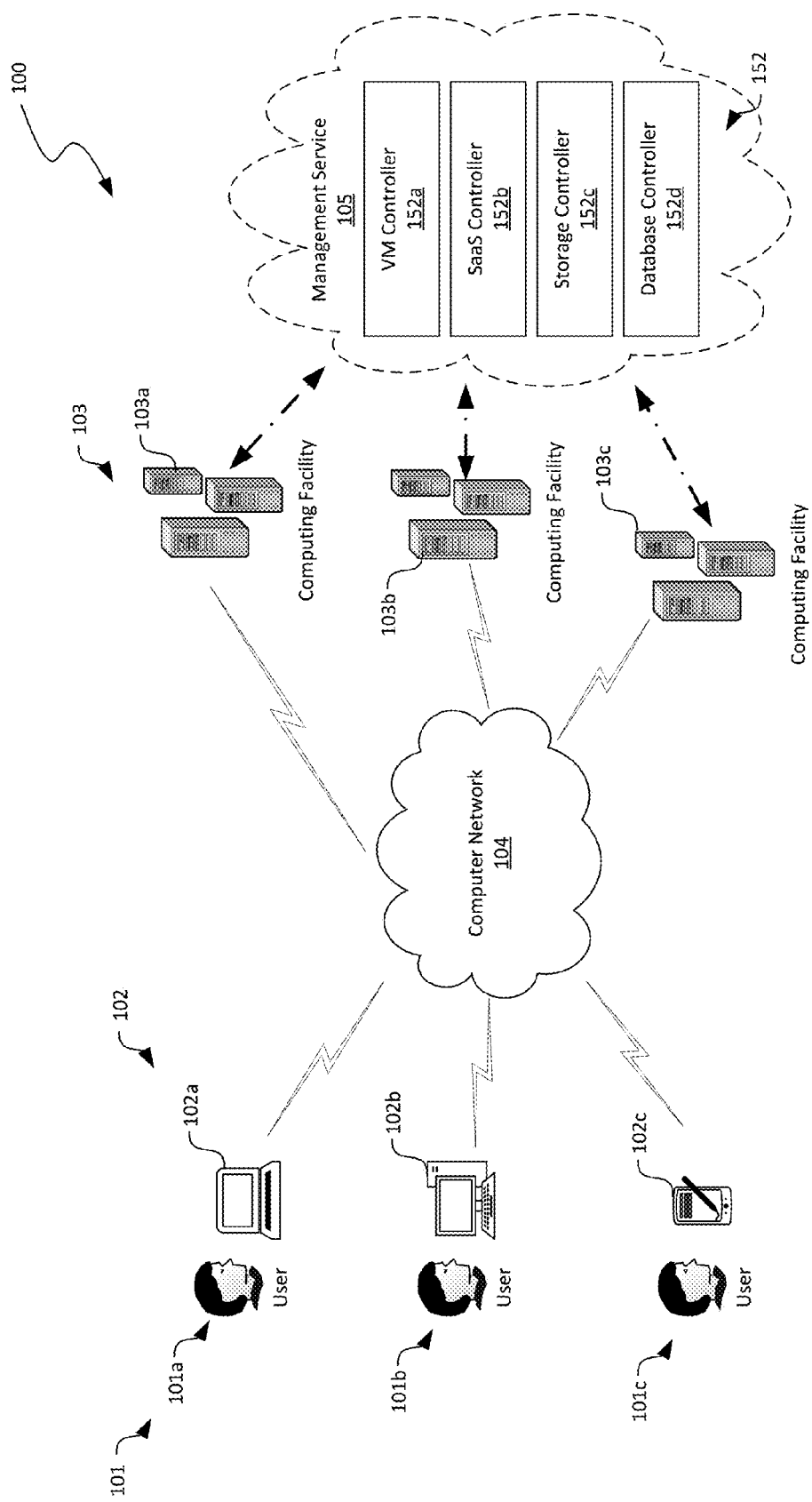
FIG. 1 is a schematic diagram of a cloud computing system implementing service location management in accordance with embodiments of the disclosed technology.

Certain embodiments of computing systems, devices, components, modules, routines, and processes for facilitating service location management in cloud computing systems are described below. In the following description, specific details of components are included to provide a thorough understanding of certain embodiments of the disclosed technology. A person skilled in the relevant art can also understand that the disclosed technology may have additional embodiments or may be practiced without several of the details of the embodiments described below with reference to FIGS. 1-6.

As used herein, the term "cloud computing system" or "cloud" generally refers to a computer system configured to provide various cloud computing services via a computer network. A cloud computing system can include multiple "computing facilities" or "cloud facilities" interconnected by a computer network such as a wide area network or the Internet. In certain embodiments, the computing facilities can include datacenters each sited in different physical locations. For example, datacenters can be located in distinct city blocks, cities, states, metropolitan areas, countries, regions, continents, or other suitable boundaries. In other embodiments, the computing facilities can also include computing clusters, failure domains, or other suitable physical and/or logical division of a datacenter. In further embodiments, a computing facility can also include a group of datacenters in a geological location.

In certain embodiments, a computing facility can include a computer network containing network devices interconnecting remote servers or hosts to one another and/or to external networks (e.g., the Internet). For example, a computing facility can include multiple containers, racks, or other suitable enclosures each holding multiple servers. The term "network device" generally refers to a network communications component. Example network devices include routers, switches, hubs, bridges, load balancers, security gateways, or firewalls. A "host" generally refers to a computing device configured to implement one or more virtual machines, virtual routers, virtual gateways, or other suitable virtualized computing components. For example, a host can include a computing server having a hypervisor configured to support one or more virtual machines.

Also used herein, the term "cloud computing service," "cloud service," or "service" generally refers to one or more computing resources provided over a computer network such as the Internet by a remote computing facility. Example cloud services include software as a service ("SaaS"), platform as a service ("PaaS"), and infrastructure as a service ("IaaS"). SaaS is a software distribution technique in which software applications are hosted by a cloud service provider in, for instance, datacenters, and accessed by users over a computer network. PaaS generally refers to delivery of operating systems and associated services over the computer network without requiring downloads or installation. IaaS generally refers to outsourcing equipment used to support storage, hardware, servers, network devices, or other components, all of which are made accessible over a computer network.

Also used herein, the term "service controller" generally refers to a cloud controller configured to facilitate allocation, instantiation, migration, monitoring, or other manage operations related to provide certain type(s) of cloud services. Example service controllers can include a virtual machine controller, a SaaS controller, a storage controller, a database controller, of other suitable types of controller. For example, a virtual machine controller can be configured to facilitate allocation, instantiation, or migration of virtual machines to different cloud facilities. In certain embodiments, a service controller can be configured to offer representational state transfer ("REST") Application Programming Interfaces ("APIs") for working with associated cloud facilities. In other embodiments, a service controller can also be configured to offer other suitable types of interfaces.

In certain implementations, a service controller can be implemented in a cloud facility as a cloud service. Duplicate instances of the same service controller can be implemented in multiple cloud facilities in a cloud computing system. The multiple instances of the service controller can then cooperate with one another to arrive at a decision based on quorum, priority, or other suitable criteria. For example, multiple instances of the service controller can provide responses to a service request. A particular response associated with a majority of the instances of the service controller can be deemed as a final response. In other implementations, a service controller can be an independent server in a cloud facility, or can have other suitable configurations.

As used herein, a "management service" generally refers to a cloud service configured to coordinate operations of various service controllers in a cloud computing system. The management service can be implemented generally similarly as a service controller, or implemented in other suitable manners as a cloud service in the cloud computing system. As described in more detail below, the management service can be configured to facilitate a determination of overall preference for allocating cloud services in a cloud computing system having multiple cloud facilities.

Certain cloud services can prefer to be physically close to one another for performance, maintenance, or other suitable reasons. Such placement preference is typically associated with a service controller managing similar services. Such controller-based deployment management, however, can have limited effectiveness when handling certain applications with dissimilar services that are managed in dissimilar ways. For example, an application can include a set of virtual machines with associated storage services, database services, and/or other suitable types of cloud services. The dissimilar services can prefer to be physically close to one another but typically do not share a common service controller. Each type of services can be managed by one or more distinct service controllers. As such, facilitating placement affinity in a collection of dissimilar services can be a challenge for cloud service providers.

Several embodiments of the disclosed technology are directed to techniques in allocating dissimilar services as a collection to computing facilities that are physically and sufficiently close to one another. The collection of dissimilar services can also be moved as a group during a regional or facility-level failover, and can be restored to the original facility after failures are repaired. In certain implementations, an application can declaratively specify a collection of services of different types. Each specified service can be identified with a corresponding service controller configured to manages the specified service. The service controllers can then participate in a bidding process to determine a location for deploying or moving the collection of services as a group based on collective preferences of the service controllers, as described in more detail below with reference to FIGS. 1-6

FIG. 1 is a schematic diagram of a cloud computing system 100 implementing service location management in accordance with embodiments of the disclosed technology. As shown in FIG. 1, the cloud computing system 100 can include multiple computing facilities 103 (identified individually as first, second, and third computing facilities 103a-103c, respectively) interconnected with client devices 102 of users 101 via a computer network 104. The computer network 104 can include a wide area network, a local area network, the Internet, or other suitable types of network. One example computer network 104 is described in more detail below with reference to FIG. 2A.

Even though particular components and associated arrangements of the cloud computing system 100 are shown in FIG. 1, in other embodiments, the cloud computing system 100 can include additional and/or different components. For example, in the illustrated embodiment, the cloud computing system 100 includes three, i.e., first, second, and third computing facilities 103a-103c. In other embodiments, the cloud computing system 100 can include three, four, or any other suitable number of computing facilities 103. In further embodiments, the cloud computing system 100 can also include web servers, domain name servers, or other suitable components.

The client devices 102 can individually include a computing device that facilitates access to the computing facilities 103 via the computer network 104 by users 101. For example, in the illustrative embodiment, the client devices 102 individually include a laptop computer 102a, a desktop computer 102b, and a digital personal assistant 102c. In other embodiments, the client devices 102 can also include tablet computers, smartphones, or other suitable computing devices. Even though three users 101 are shown in FIG. 1 for illustration purposes, in other embodiments, the cloud computing system 100 can facilitate any suitable number of users 101 access to the computing facilities 103 via the computer network 104.

The computing facilities 103 can be individually configured to provide subscriptions of certain cloud services to the users 101. In certain embodiments, the computing facilities 103 can be sited in different locations. For example, the computing facilities 103 can each be located in a different city, country, or other suitable areas. Each of the computing facilities 103 can also include different configuration or operation profiles. In one example, the first computing facility 103a can have more computing capacity than the second or third computing facilities 103b and 103c. The second computing facility 103b can have more storage capacity than the other computing facilities. In another example, the third computing facility 103c can have more idle capacities in computing, storage, network, or other suitable types of resources than the other computing facilities 103.

As shown in FIG. 1, the cloud computing system 100 can also include multiple service controllers 152. In the illustrated embodiment, the service controllers 152 include a virtual machine controller 152a, a SaaS controller 152b, a storage controller 152c, and a database controller 152d. Each of the foregoing service controllers 152 can be aware of the computing facilities 103 and associated configuration or operation profiles. The service controllers 152 can then be configured to allocate and deploy corresponding cloud services to the individual computing facilitates 103. For instance, the virtual machine controller 152a can be configured to allocate and instantiate one or more virtual machines to one or more of the computing facilities 103 based on an available capacity, capability, or other suitable profiles of the computing facilities 103. The SaaS controller 152b, the storage controller 152c, and the database controller 152d can be configured to allocate a SaaS service, a storage service, and a database service to one or more computing facilities 103, respectively. In other embodiments, the service controllers 152 can also include an email controller, web server controller, or other suitable types of service controllers 152. Example components of a computing facility 103 suitable for either the cloud computing system 100 are described in more detail below with reference to FIGS. 2A-2B.

As shown in FIG. 1, the cloud computing system 100 can also include a management service 105 configured to facilitate operations of the service controllers 152. In certain embodiments, the management service 105 can be configured to receive a service request from one of the users 101 for deploying an application in the cloud computing system 100. In response, the management service 105 can be configured to query the service controllers 152 regarding which computing facilities 103 are preferred by the individual service controllers 152 for deploying various cloud services associated with the application. The management service 105 can then receive a list of computing facilities 103 in order of preference from the individual service controllers 152 and determine an overall preference based thereon, as described in more detail below with reference to FIGS. 3A-4D.

Figure 2A:
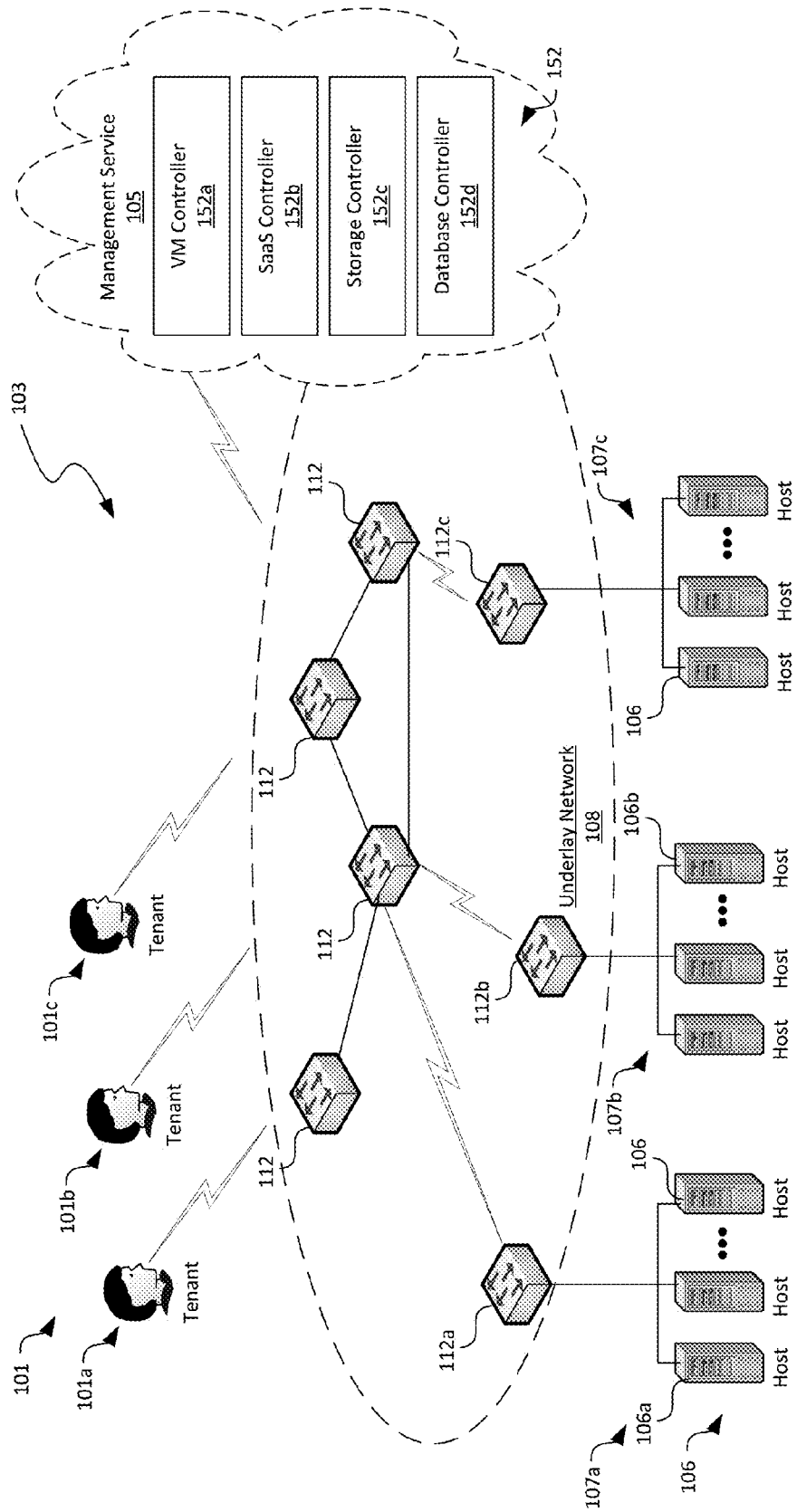
FIG. 2A is a schematic diagram illustrating a computing facility suitable for the cloud computing system in FIG. 1 in accordance with embodiments of the disclosed technology.

FIG. 2A is a schematic diagram illustrating a computing facility 103 suitable for either the cloud computing system 100 of FIG. 1 in accordance with embodiments of the disclosed technology. As shown in FIG. 2A, the computing facility 103 can include an underlay network 109 interconnecting a plurality of client devices 102 associated with users 101 and multiple hosts 106. Even though particular components of the computing facility 103 are shown in FIG. 2A, in other embodiments, the computing facility 103 can also include additional and/or different constituents. For example, the computing facility 103 can also include additional computing fabrics (not shown) interconnected with one another, network storage devices, utility infrastructures, and/or other suitable components.

As shown in FIG. 2A, the underlay network 109 can include one or more physical network devices 112 that interconnect the users 101 and the hosts 106. Examples of the network devices 113 can include routers, switches, firewalls, load balancers, or other suitable network components. Even though particular connection scheme is shown in FIG. 2A for illustration purposes, in other embodiments, the network devices 112 can be operatively coupled in a hierarchical, flat, "mesh," or other suitable topologies.

As shown in FIG. 2A, the hosts 106 can be operatively coupled to one another by the network devices 113. In certain embodiments, the hosts 106 can individually include a processor, a physical server, or several physical servers. In other embodiments, the hosts 106 can also include a virtual server or several virtual servers. The hosts 106 can be organized into racks, availability zones, groups, sets, computing clusters, or other suitable divisions. For example, in the illustrated embodiment, the hosts 106 are grouped into three computing clusters 107 (shown individually as first, second, and third computing clusters 107a-107c, respectively), which are operatively coupled to respective network devices 112a-112c in the underlay network 109. Even though three computing clusters 107 are shown in FIG. 2A for illustration purposes, in other embodiments, the computing facility 103 can include one, two, eight, ten, sixteen, or any other suitable numbers of computing clusters 107 with similar or different components and/or configurations.

As shown in FIG. 2A, the computing facility 103 can also be coupled to a management service 105 and multiple service controllers 152 configured to monitor, control, or otherwise manage operations of the hosts 106 in the computing clusters 107. For example, in certain embodiments, the service controllers 152 can include fabric controllers (or certain components thereof) configured to manage processing, storage, communications, or other suitable types of hardware resources in the computing clusters 107 for hosting cloud services. In other embodiments, the management service 105 can also include a datacenter controller, application delivery controller, or other suitable types of controller or components thereof. In the illustrated embodiment, the management service 105 is shown as being separate from the computing clusters 107. In other embodiments, the management service 105 can include one or more hosts 106 in the computing clusters 107. In further embodiments, the management service 105 can include software services hosted on one or more of the hosts 106 in the computing clusters 107.

Figure 2B:
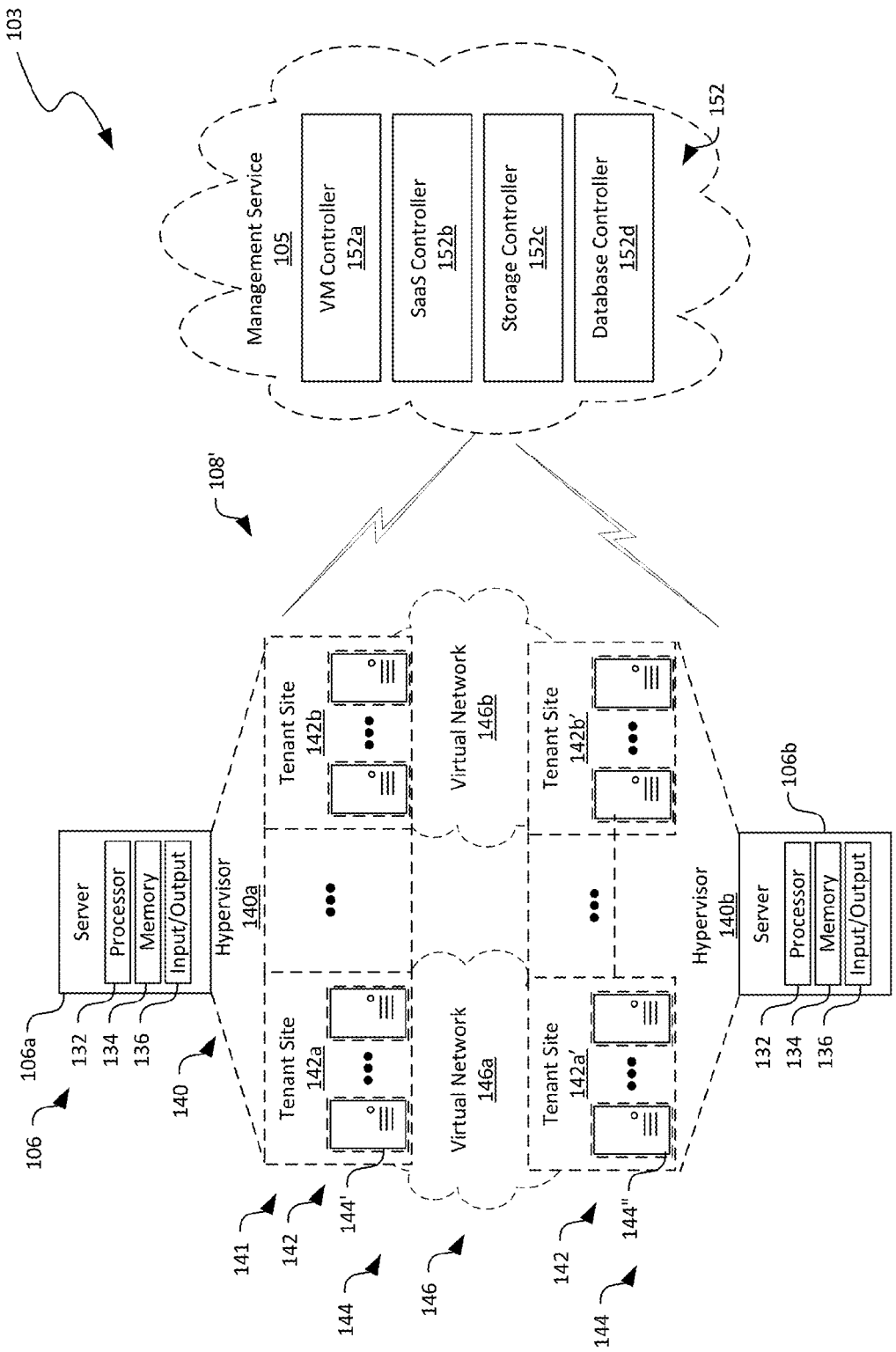
FIG. 2B is a schematic diagram illustrating certain hardware/software components of the computing facility in FIG. 2A in accordance with embodiments of the disclosed technology.

FIG. 2B is a schematic diagram illustrating an example overlay network 109' implemented on the underlay network 109 and suitable for the computing facility 103 of FIG. 2A in accordance with embodiments of the disclosed technology. In FIG. 2B, only certain components of the underlay network 109 of FIG. 2A are shown for clarity. As shown in FIG. 2B, a first host 106a and the second host 106b can each include a processor 132, a memory 133, and an input/output component 136 operatively coupled to one another. The processor 132 can include a microprocessor, a field-programmable gate array, and/or other suitable logic devices. The memory 134 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 132 (e.g., instructions for performing the methods discussed below with reference to FIGS. 5A-5C). The input/output component 136 can include a display, a touch screen, a keyboard, a mouse, a printer, and/or other suitable types of input/output devices configured to accept input from and provide output to an operator and/or an automated software controller (not shown).

The memory 134 of the first and second hosts 106a and 105b can include instructions executable by the processors 132 to cause the individual processors 132 to provide a hypervisor 140 (identified individually as first and second hypervisors 140a and 140b) and other suitable components (not shown). The hypervisors 140 can individually be configured to initiate, monitor, terminate, and/or otherwise locally manage one or more virtual machines 144 organized into tenant sites 142. For example, as shown in FIG. 2B, the first host 106a can provide a first hypervisor 140a that manages first and second tenant sites 142a and 142b, respectively. The second host 106b can provide a second hypervisor 140b that manages first and second tenant sites 142a' and 142b', respectively. The hypervisors 140 can be software, firmware, or hardware components. The tenant sites 142 can each include multiple virtual machines 144 or other suitable tenant instances for a particular user 101. For example, the first host 106a and the second host 106b can both host the tenant site 142a and 142a' for the first user 101a (FIG. 1). The first host 106a and the second host 106b can both host the tenant site 142b and 142b' for the second user 101b (FIG. 1). Each virtual machine 144 can be executing a corresponding operating system, middleware, and/or applications. In certain embodiments, the virtual machines 144 hosted on one or more of the hosts 106 can be utilized to perform one or more user requested tasks. In other embodiments, the virtual machines 144 or other suitable components of the computing facility 103 can also be utilized to implement other suitable cloud services.

Also shown in FIG. 2B, the computing facility 103 can include an overlay network 109' having one or more that interconnect the tenant sites 142a and 142b across multiple hosts 106. For example, a first virtual network 146a interconnects the first tenant sites 142a and 142a' at the first host 106a and the second host 106b. A second virtual network 146b interconnects the second tenant sites 142b and 142b' at the first host 106a and the second host 106b. Even though a single virtual network 146 is shown as corresponding to one tenant site 142, in other embodiments, multiple virtual networks 146 (not shown) may be configured to correspond to a single tenant site 142.

The virtual machines 144 on the virtual networks 146 can communicate with one another via the underlay network 109

(FIG. 2A) even though the virtual machines 144 are located on different hosts 106. Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machine 145 in a particular virtual network 146. Thus, different virtual networks 146 can use one or more virtual network addresses that are the same. Example virtual network addresses can include IP addresses, MAC addresses, and/or other suitable addresses.

Referring to both FIGS. 2A and 2B, in operation, the users 101 can request deployment of an application via, for example, a user portal (not shown). For example, a user 101 can request instantiation of a virtual machine 144 operable with a database service. In response to receiving the service request from the user 101, the management service 105 can verify a subscription level of the user 101, and provision for allocation and instantiation of the requested virtual machine and database service upon verification. The management service 105 can then instruct the virtual machine controller 152a to cause one or more of the hosts 106 to instantiate the requested virtual machine 145, as described in more detail below with reference to FIGS. 3A-3C.

Figure 3A:
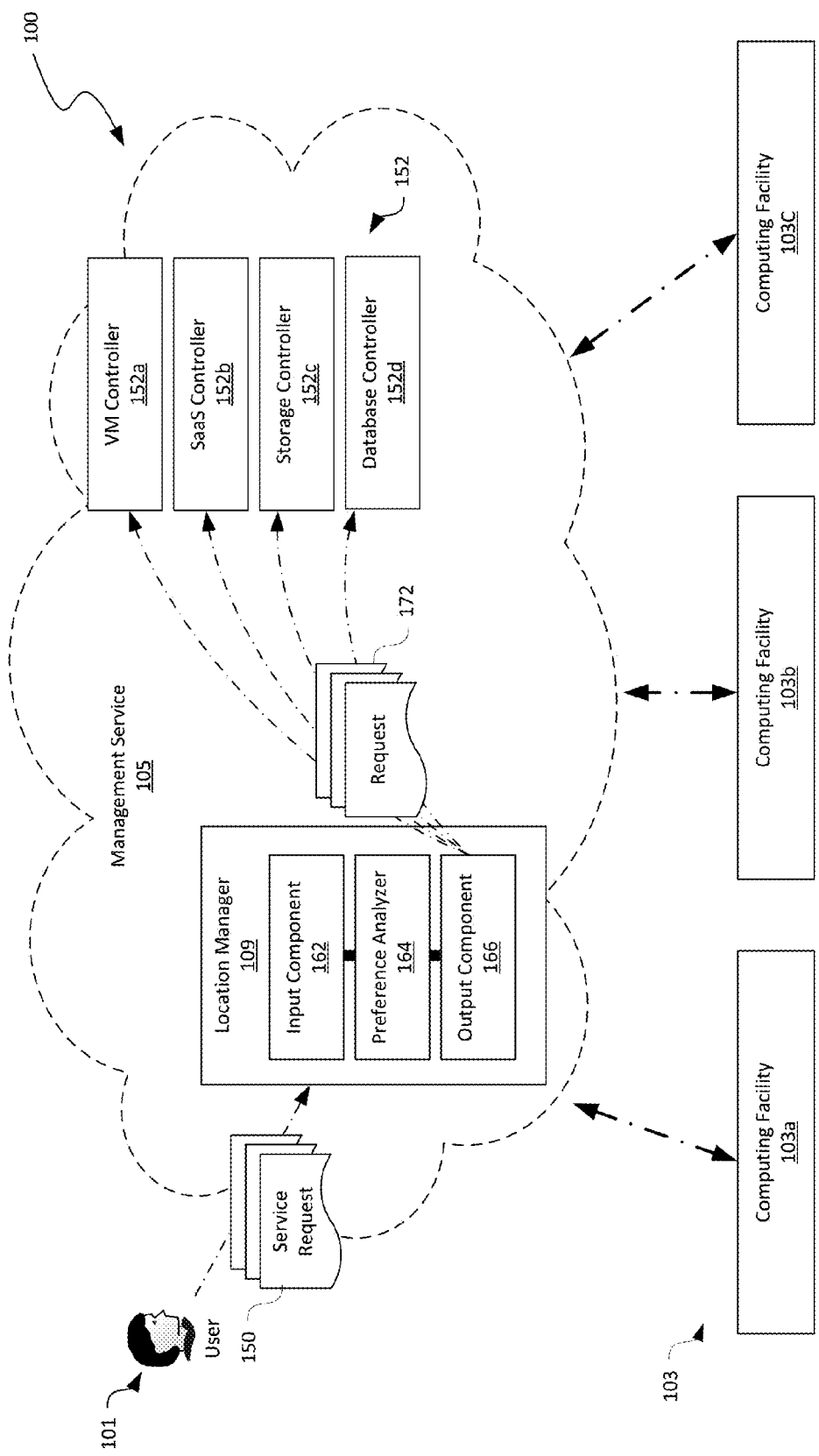
FIGS. 3A-3C are schematic diagrams illustrating certain hardware/software components of the cloud computing system in FIG. 1 during certain stages of determining an overall preference location for deploying services.
Figure 3B:
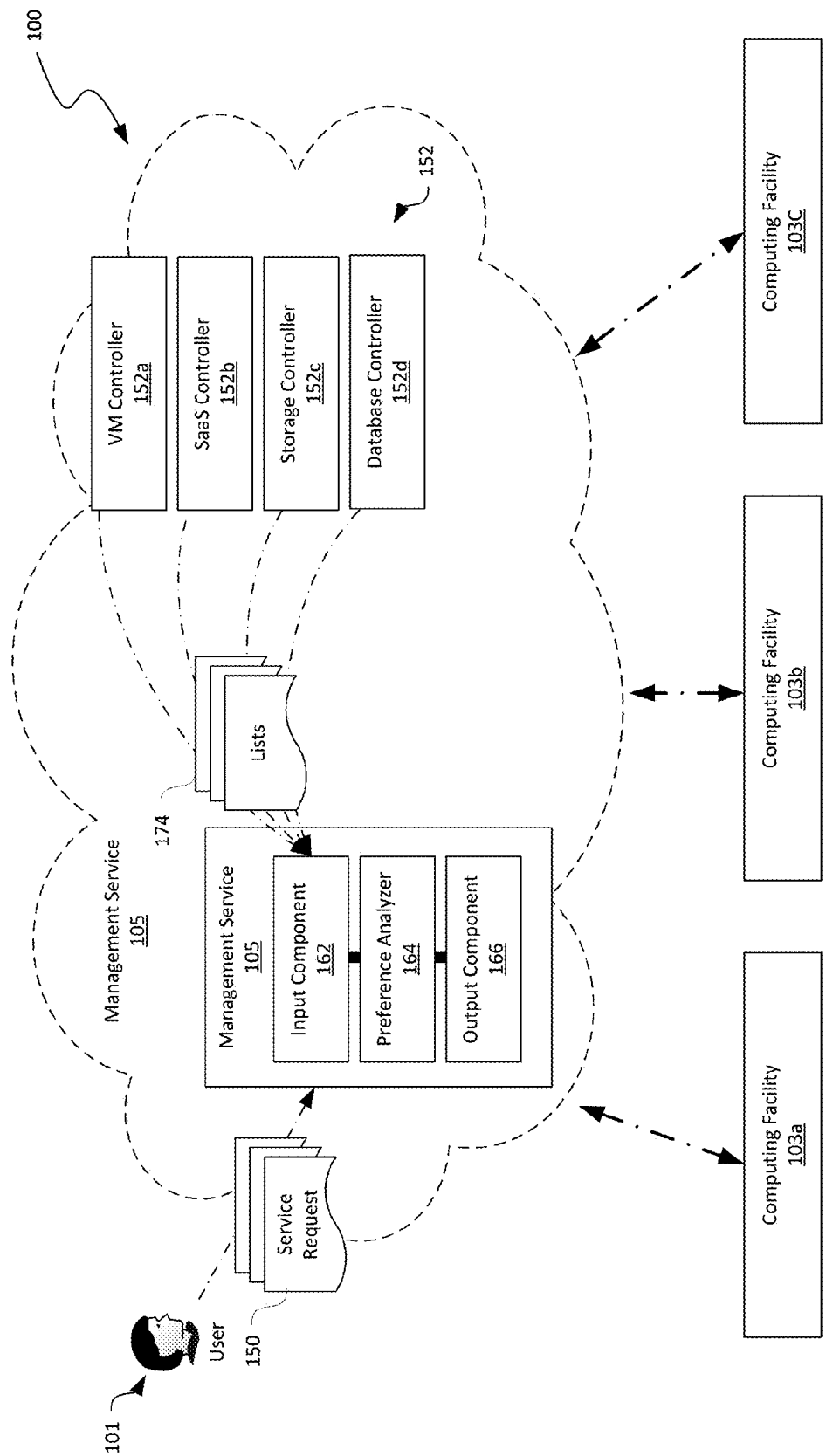
Figure 3C:
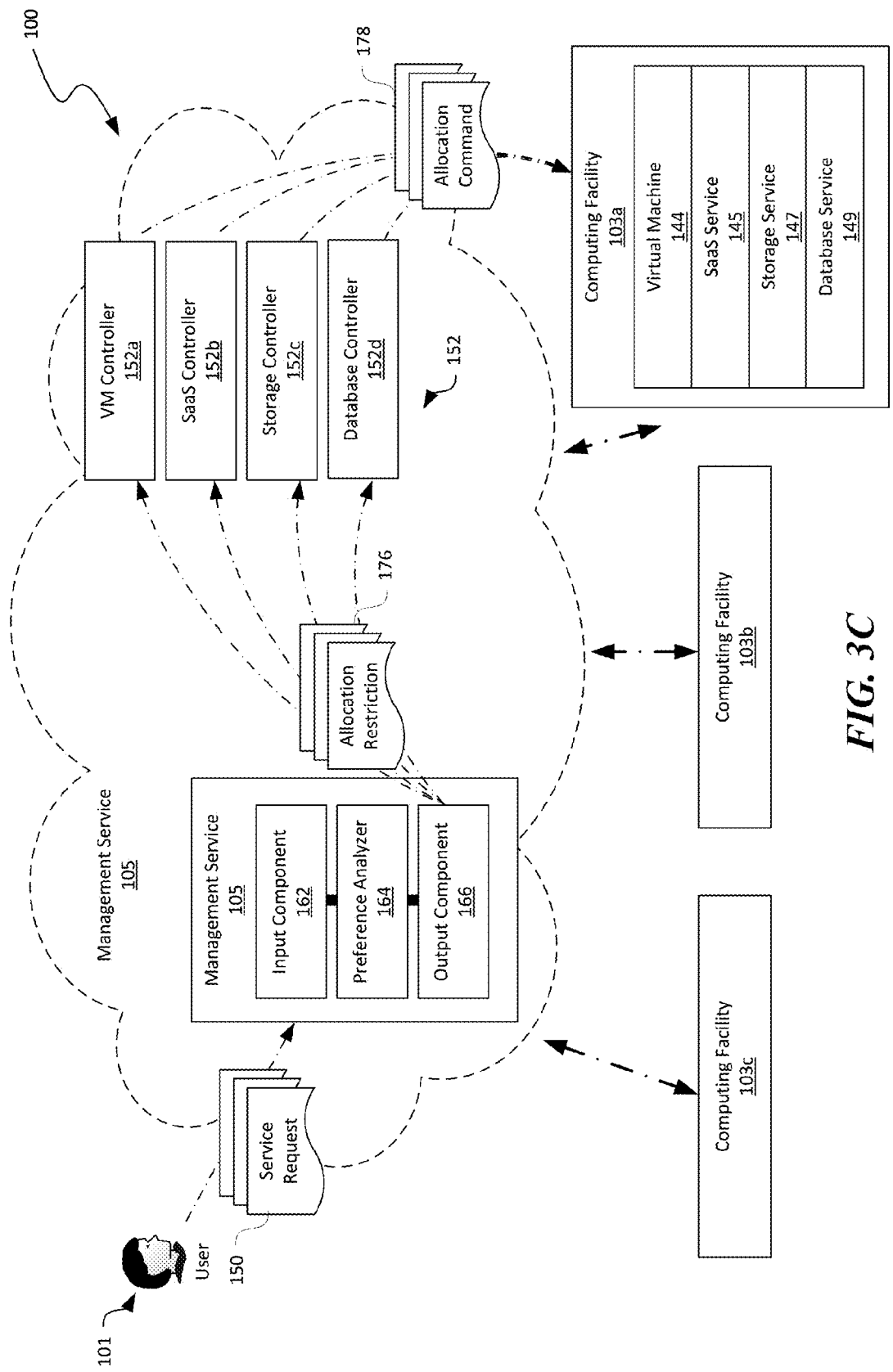

FIGS. 3A-3C are schematic diagrams illustrating certain hardware/software components of the computing facility 105 in FIGS. 2A and 2B during certain stages of allocating cloud services in accordance with embodiments of the disclosed technology. In FIGS. 3A-3C, certain components of the cloud computing system 100 are omitted for clarity. For example, only one user 101 is shown in FIGS. 3A-3C without corresponding client device 102 for illustration purposes.

In addition, in FIGS. 3A-3C and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads). In certain embodiments, the various components and modules described below can be implemented with actors. In other embodiments, generation of the application and/or related services can also be implemented using monolithic applications, multi-tiered applications, or other suitable components.

Components within a system can take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices. Equally, components may include hardware circuitry.

A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 3A, the management service 105 can include a location manager 109 having an input component 162, a preference analyzer 164, and an output component 166 operatively coupled to one another. The input component 162 can be configured to receive a service request 150 from the user 101. The service request 150 can include a request to deploy an application in the cloud computing system 100. The application can include a collection of dissimilar cloud services to be hosted on one or more of the computing facilities 103. In certain embodiments, the input component 162 can include a REST API. In other embodiments, the input component 162 can include other suitable interfaces.

The output component 166 can be configured to transmit various types of messages to the service controllers 152. For example, as shown in FIG. 3A, the output component 166 can be configured transmit a request 172 to each of the service controllers 152 for a list of computing facilities 103 in order of preference from the service controllers 152. The request 172 can identify the collection of dissimilar cloud services to be deployed and associated location constraints, degrees to which the constraints can be relaxed, and other suitable information. In certain embodiments, the output component 166 can include a messaging service configured according to a suitable protocol (e.g., TCP/IP). In other embodiments, the output component 166 can include other modules suitable for communicating with the service controllers 152.

As shown in FIG. 3B, in response to receiving the request 172, the individual service controllers 152 can submit a list 174 of computing facilitates 103 (identified below as "CFs") in order of preference for deploying one or more of the dissimilar services associated with the application. For example, the virtual machine controller 152a, the SaaS controller 152b, the storage controller 152c, and the database controller 152d can submit the following lists, respectively:

List 1 : CF1, CF3, CF2
List 2: CF2, CF3, CF1
List 3 : CF1, CF2, CF3
List 4 : CF1, CF2, CF3.

The preference analyzer 164 can be configured to analyze the received lists of computing facilitates 103 from the service controllers 152 and derive an overall preference facility for allocating and deploying the collection of dissimilar cloud services related to the application.

In certain embodiments, the preference analyzer 164 can assign a numerical value to each of the computing facilities 103 in the lists based on the ranking of the corresponding computing facility 103. For example, values of 3, 2, and 1 can be assigned to a first choice, a second choice, and a third choice, respectively. Thus, in the example above, CF1 in list1would be assigned a value of 3 while CF1 in list 2 would be assigned a value of 1. In other embodiments, values for different rankings can be skewed to affect an overall weight for a particular ranking. For example, instead of a value of 3, a first choice can be assigned a value of 5 while the second and third choices are assigned values of 2 and 1, respectively. As such, a first choice can outweigh a combination of both a second choice and a third choice. In other examples, value increments may be decreased to lessen the weight placed on different rankings.

In further embodiments, the preference analyzer 164 can also be configured to apply a weighting factor to one or more lists 174 based on corresponding service controllers 152. For example, the preference analyzer 164 can apply a weighting factor of greater than one (e.g., 2) to list 3 received from the storage controller 152c because a storage service may be more expensive to move than other services. As such, in the example above, the CF1 is list 3 would be assigned a value of 3×2=6 while the first choices in other lists 174 are assigned a value of 3. In other examples, the preference analyzer 164 can also apply a weighting factor of less than one (e.g., 0.5) to certain list(s) 174 to lessen preference impacts of the list(s) 174.

The preference analyzer 164 can then be configured to sum all assigned values to each of the computing facilities 103 to derive a total value thereof. For instance, in the example above, when values of 3, 2, and 1 are assigned to a first choice, a second choice, and a third choice, respectively, the first computing facility 103a (CF1) would have a total value of 10. The second computing facility 103b (CF2) would have a total value of 8. The third computing facility 103c (CF3) would have a total value of 6. The preference analyzer 164 can then select a computing facility 103 with the highest total value (e.g., the first computing facility 103a) as an overall preference facility for deploying the collection of dissimilar cloud services related to the application. Thus, as shown in FIG. 3C, the preference analyzer 164 can cause the output component 166 to transmit an allocation restriction 176 to the individual service controllers 152, which in turn transmit an allocation command 178 to the first computing facility 103a to deploy the collection of dissimilar services. The allocation command 178 causes the first computing facility 103a to provision, instantiate, or otherwise provide the requested cloud services, for instance, shown as a virtual machine 144, a SaaS service 145, a storage service 147, and a database service 149.

In certain embodiments, the service request 150 can also include data identifying a co-location constraint between two or more of the cloud services and a threshold degree to which the co-location constraint can be relaxed. For instance, in the example shown in FIG. 3C, the service request 150 can specify that the virtual machine 144 must be co-located with the storage service 147 in a single computing facility 103. However, the SaaS service 145 may be located in a different computing facility 103 than that hosting the virtual machine 144 and the storage service 147. In response, the preference analyzer 164 can evaluate the lists 174 (FIG. 3B) and determine that the SaaS service 145 is to be allocated to the second computing facility 103b while the other services are allocated to the first computing facility 103a.

In further embodiments, the individual service controllers 152 can also specify which computing facility 103 is not acceptable for deploying a particular service. In response, the preference analyzer 164 can filter the computing facilities 103 to eliminate the unacceptable computing facility 103. For instance, in the example above, if the database controller 152d indicates that the first computing facility 103a is not acceptable for deploying the database service 149, the preference analyzer 164 can then eliminate the first computing facility 103a and designate instead the second computing facility 103b as the overall preference facility. In certain embodiments, the management service 105 can also be configured to facilitate migration of some or all of the deployed cloud services related to the application in response to a failure, outage, or other suitable operational issues encountered in the computing facilities 103, as described in more detail below with reference to FIGS. 4A-4D.

Figure 4A:
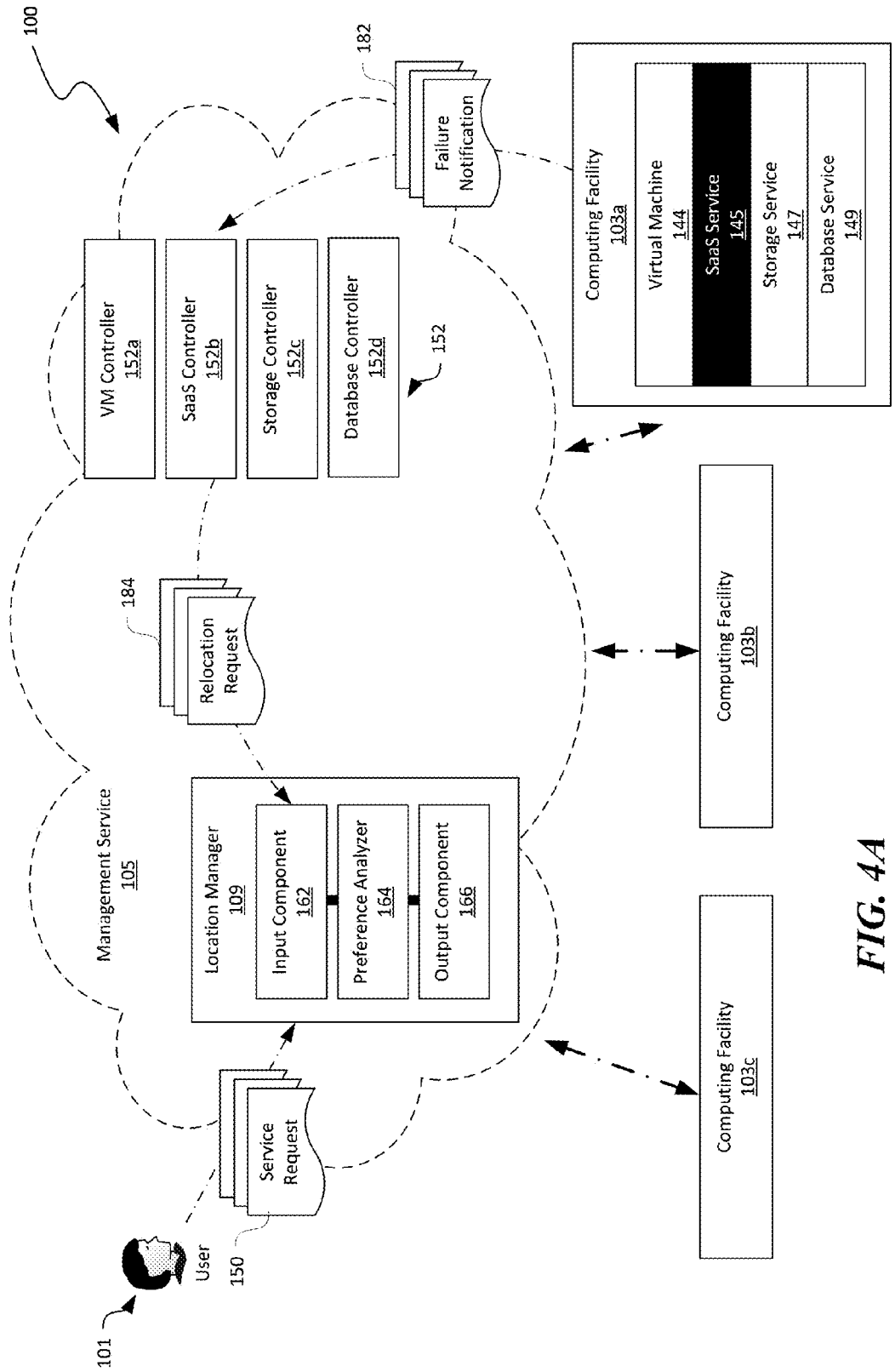
FIGS. 4A-4D are schematic diagrams illustrating certain hardware/software components of the cloud computing system in FIG. 1 during certain stages of relocating deployed services.

FIGS. 4A-4D are schematic diagrams illustrating certain hardware/software components of the cloud computing system 100 in FIG. 1 during certain stages of relocating deployed services. As shown in FIG. 4A, the first computing facility 103a can detect that, for example, the SaaS service 145 deployed in the first computing facility 103a has failed, encountered an operational issue, or otherwise need relocation (shown as highlighted for illustration). The first computing facility 103a can inform the SaaS controller 152b regarding the detected failure via a failure notification 182. In response to receiving the failure notification 182, the SaaS controller 152b can transmit a relocation request 184 to the location manager 109 of the management service 105.

Figure 4B:
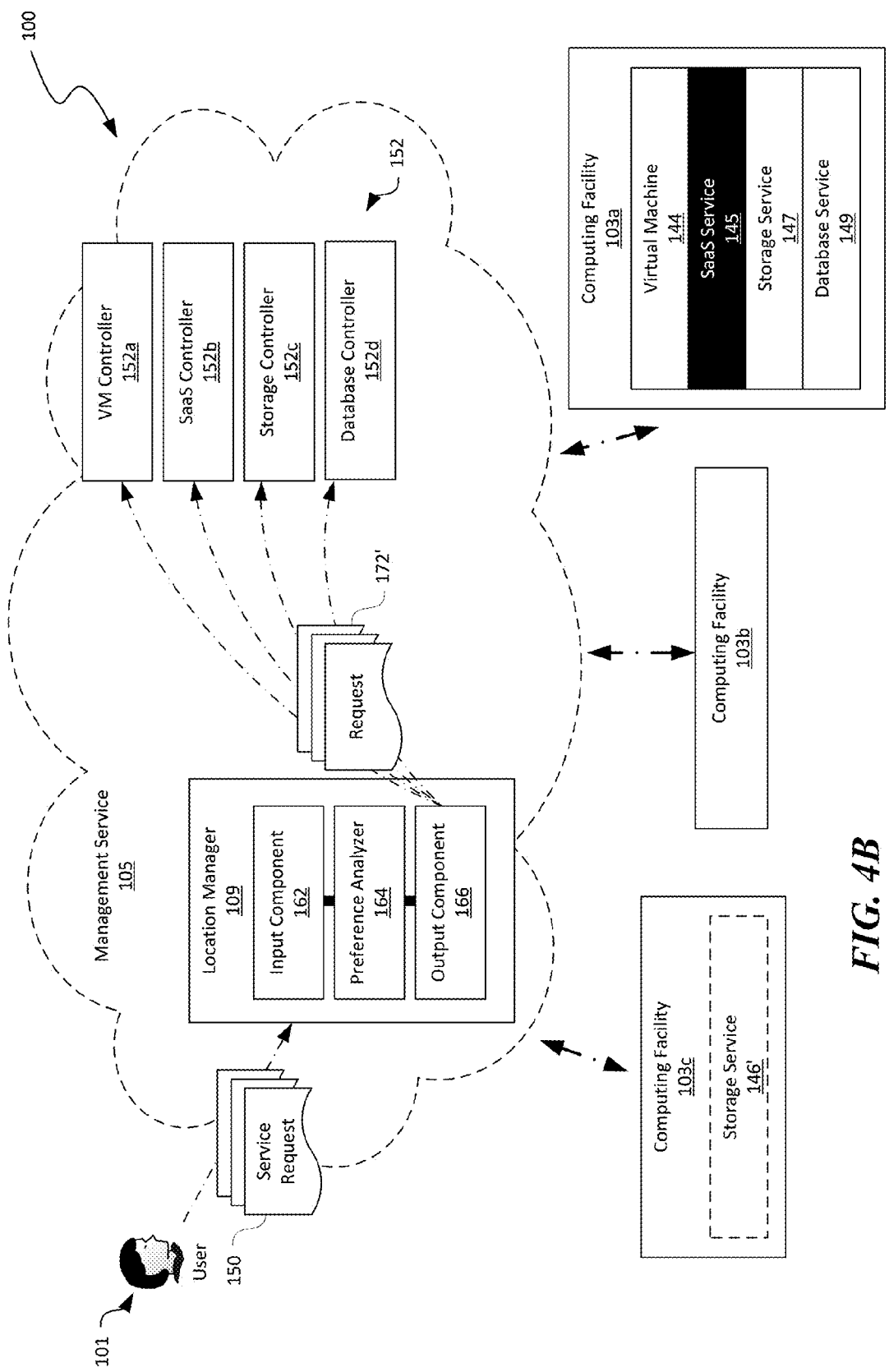

As shown in FIG. 4B, in response to receiving the relocation request 184, the location manager 109 can transmit, via the output component 166, another request 172' to the individual service controllers 152 for another list of the computing facilities 103 in order of preference. In response, the service controllers 152 can provide new lists 174' of the computing facilities 103 to the location manager 109. At least one of the service controllers 152 (e.g., the SaaS controller 152b) can provide a list that is different than an original list based on the received failure notification 182 (FIG. 4A). For instance, in the example described above with reference to FIG. 3C, the SaaS controller 152b can provide the revised list 2' as follows:

List 2': CF3, CF2 in which the first computing facility 103a is deemed unacceptable by the SaaS controller 152b.

Figure 4C:
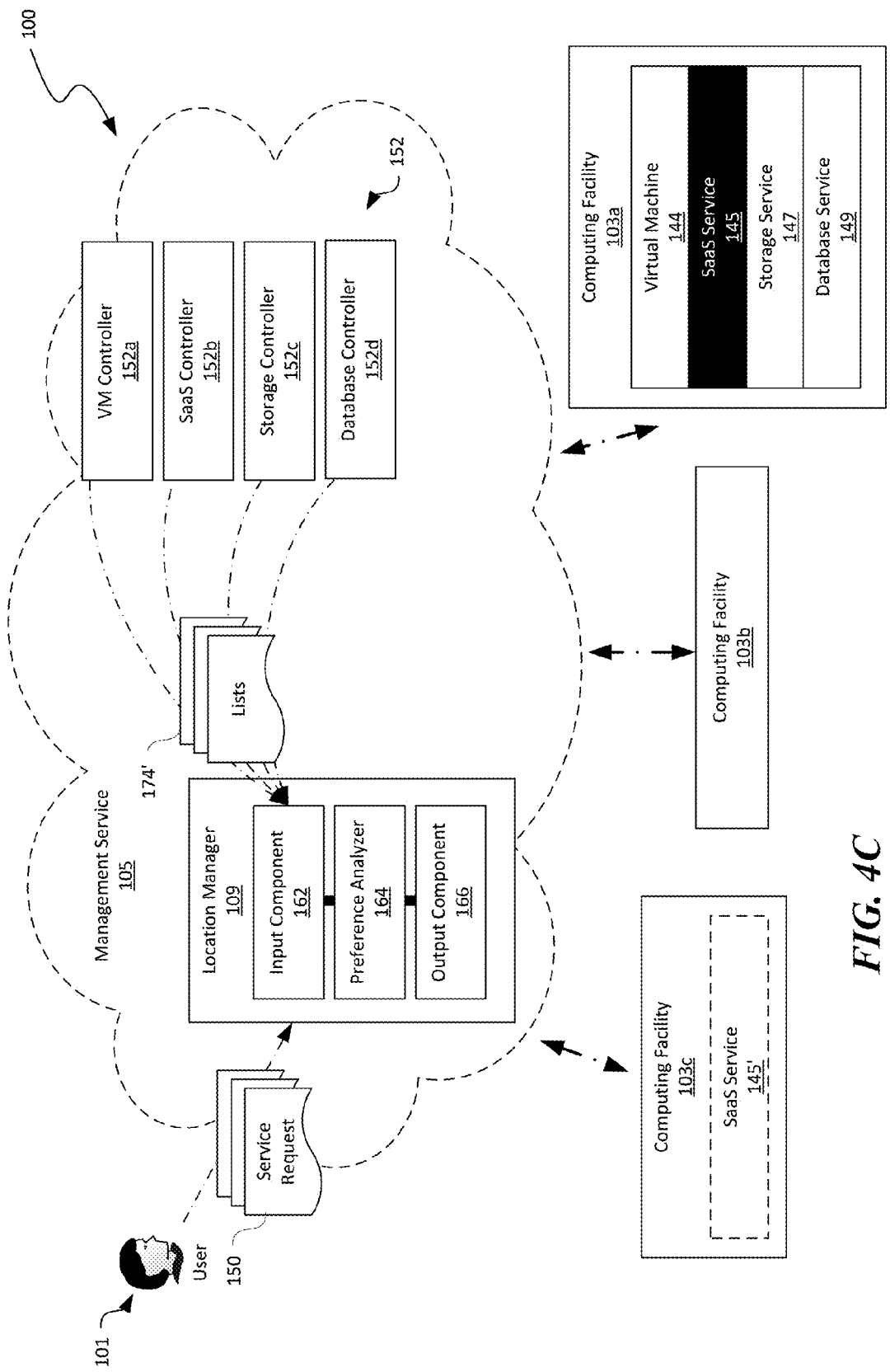

In certain embodiments, the SaaS controller 152b can also promote rankings of certain computing facilities 103 based on existence of a duplicate instance or other suitable reasons. For example, as shown in FIG. 4C, a duplicate instance of the SaaS service 149' can be hosted on the third computing facility 103c due to, for example, regional duplication policies. As such, in the new list 2', the SaaS controller 152b can promote the third computing facility 103c over the second computing facility 103b. In other embodiments, the SaaS controller 152b can also increase weight of the submitted new list 2' by, for instance, insisting on a weighting factor for list 2' that is greater than one. In further embodiments, the SaaS controller 152b can also insist that the third computing facility 103c is the only choice acceptable to the SaaS controller 152b.

Figure 4D:
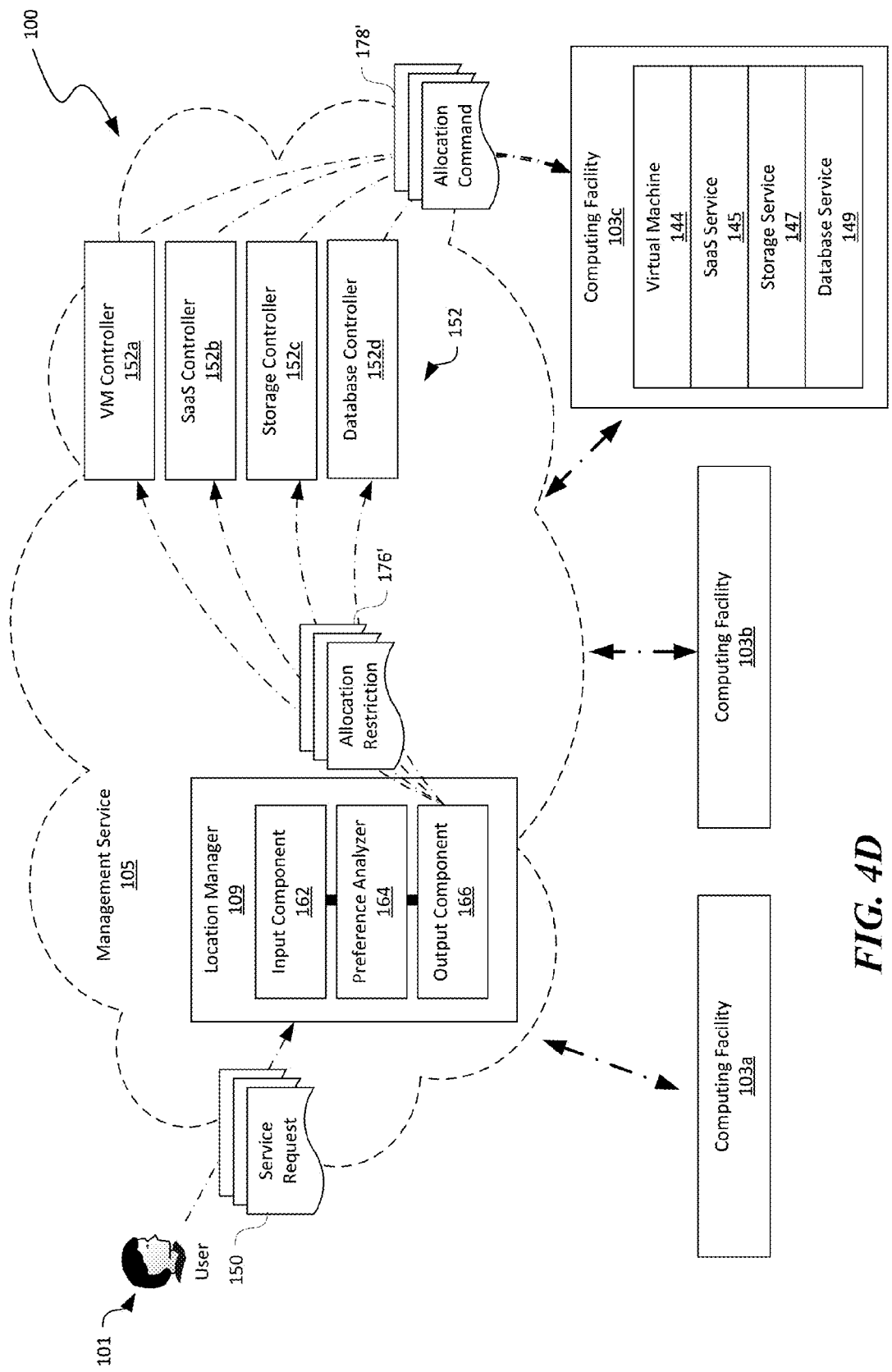

As shown in FIG. 4D, after re-evaluating the new lists 174', the preference analyzer 164 can determine that, for example, the third computing facility 103c is now the new overall preference facility for deploying the collection of dissimilar cloud services. As such, the preference analyzer 164 can cause the output component 166 to issue a new allocation restriction 176' to the individual service controllers 152, which in turn can issue corresponding allocation/migration command 178' to migrate the deployed services to the third computing facility 103c. Even though the relocation operations are described above using the SaaS service 145 as an example, in other embodiments, any of the service controllers 152 can cause the same or similar relocations operations.

Figure 5A:
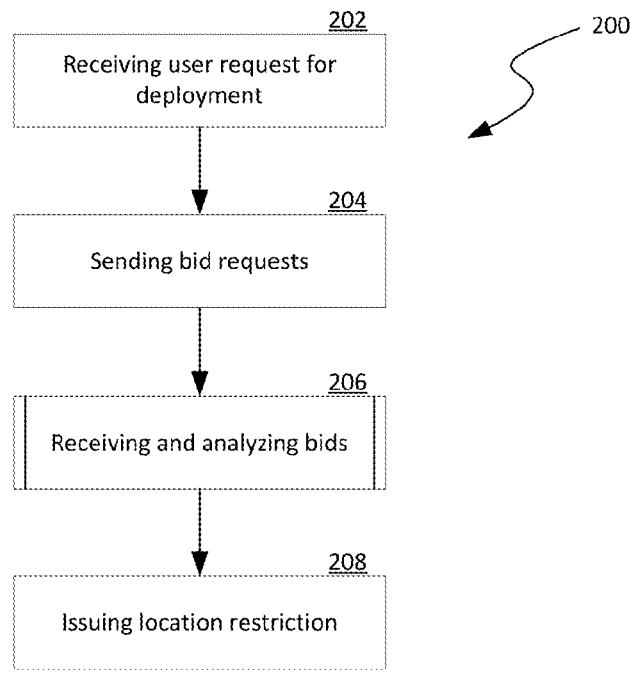
FIGS. 5A-5C are flowcharts illustrating various aspects of processes of service location management in accordance with embodiments of the disclosed technology.
Figure 5B:
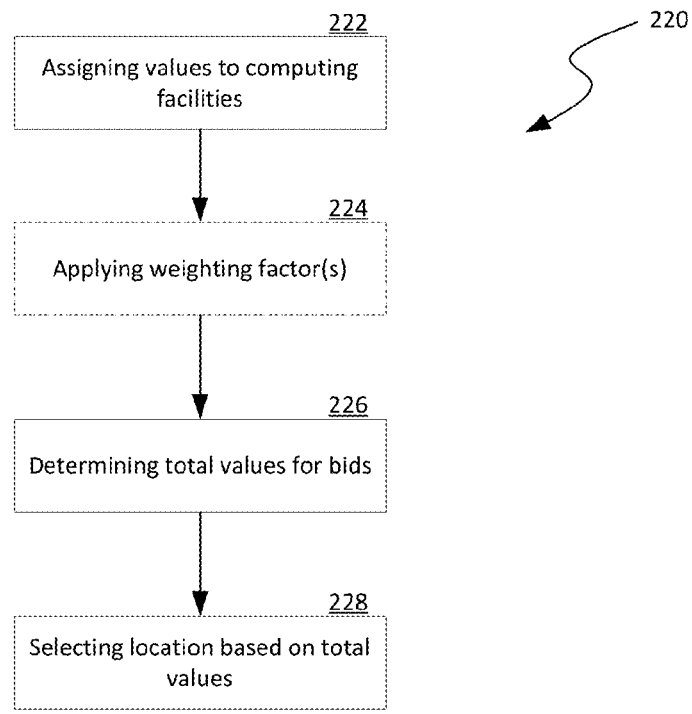
Figure 5C:
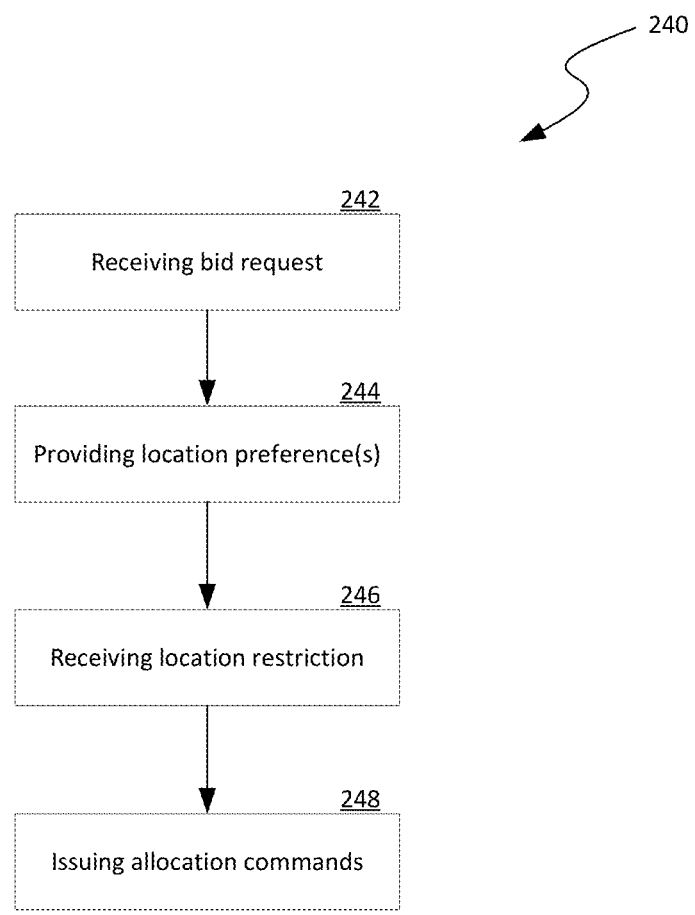

FIGS. 5A-5C are flowcharts illustrating various aspects of processes of service location management in accordance with embodiments of the disclosed technology. Even though the processes are described below with reference to the cloud computing system 100 of FIGS. 1-4D, in other embodiments, embodiments of the processes can be performed in other computing systems with additional and/or different components.

FIG. 5A is a flowchart illustrating a process 200 of allocating a collection of dissimilar cloud services to distinct computing facilities of a cloud computing system. As shown in FIG. 5A, the process 200 can include receiving a user request for deploying an application at stage 202. The application can include a collection of dissimilar cloud services, for instance, virtual machines, SaaS services, storage services, and database services. The process 200 can then include sending a bid request to individual service controllers at stage 204. The individual service controllers are configured to allocate certain types of cloud services for deployment. For example, a virtual machine controller can be configured to allocate multiple virtual machines in a single computing facility. In another example, a database controller can allocate one or more database service to one or more computing facilities.

The process 200 can then include receiving and analyzing bids from the service controllers at stage 206. In certain embodiments, the received bids can each include a list of computing facilities ranked in order of preference by the individual service controllers. Analyzing the bids can then include aggregating the preferences from all of the received lists to derive an overall preference facility. In other embodiments, the received bids can include other suitable information and be analyzed in other suitable manners to derive an overall preference. Example operations for analyzing the received bids are described below with reference to FIG. 5B. The process 200 can then include issuing a location restriction to the service controllers based on results of analyzing the received bids at stage 208.

FIG. 5B is a flowchart illustrating a process 220 of analyzing bids for allocating cloud services to distinct computing facilities of a cloud computing system. As shown in FIG. 5B, the process 220 can include assigning values to each computing facilities in order of preference. In certain embodiments, more preferred computing facilities can be assigned higher values than less preferred computing facilities. In other embodiments, more preferred computing facilities can be assigned lower values than less preferred computing facilities.

The process 220 can then include an optional stage 224 in which one or more weighting factors can be applied to individual bids. For example, to increase impact of a particular bid, the process 220 can include applying a weighting factor of more than one to computing facilities included in the bid. To decrease impact of a particular bid, the process 220 can include applying a weighting factor of less than one to computing facilities included in the bid. In other examples, the weight factors may be applied in other suitable manners. The process 220 can then include determining total values corresponding to each of the computing facilities in the bids at stage 226 and selecting an overall preference facility based on the total values at stage 228.

FIG. 5C is a flowchart illustrating a process 240 of generating bids for allocating cloud services to distinct computing facilities of a cloud computing system. As shown in FIG. 5C, the process 240 can include receiving a bid request at stage 242. In certain embodiments, the bid request can include a collection of dissimilar cloud services to be deployed in distinct computing facilities. In other embodiments, the bid request can also include co-location information related to the collection of dissimilar cloud services or other suitable information. The process 240 can then include providing facility or location preferences in response to the received bid request at stage 244. The process 240 can then include receiving a facility or location restriction at stage 246. In certain embodiments, the location restriction instructs deployment of corresponding cloud services to a most preferred location included in the provided location preferences. In other embodiments, the location restriction instructs deployment of corresponding cloud services to a less preferred location included in the provided location preferences. The process 240 can then include issuing allocation commands to computing facilities indicated in the received location restriction for deployment of the collection of dissimilar cloud services.

Figure 6:
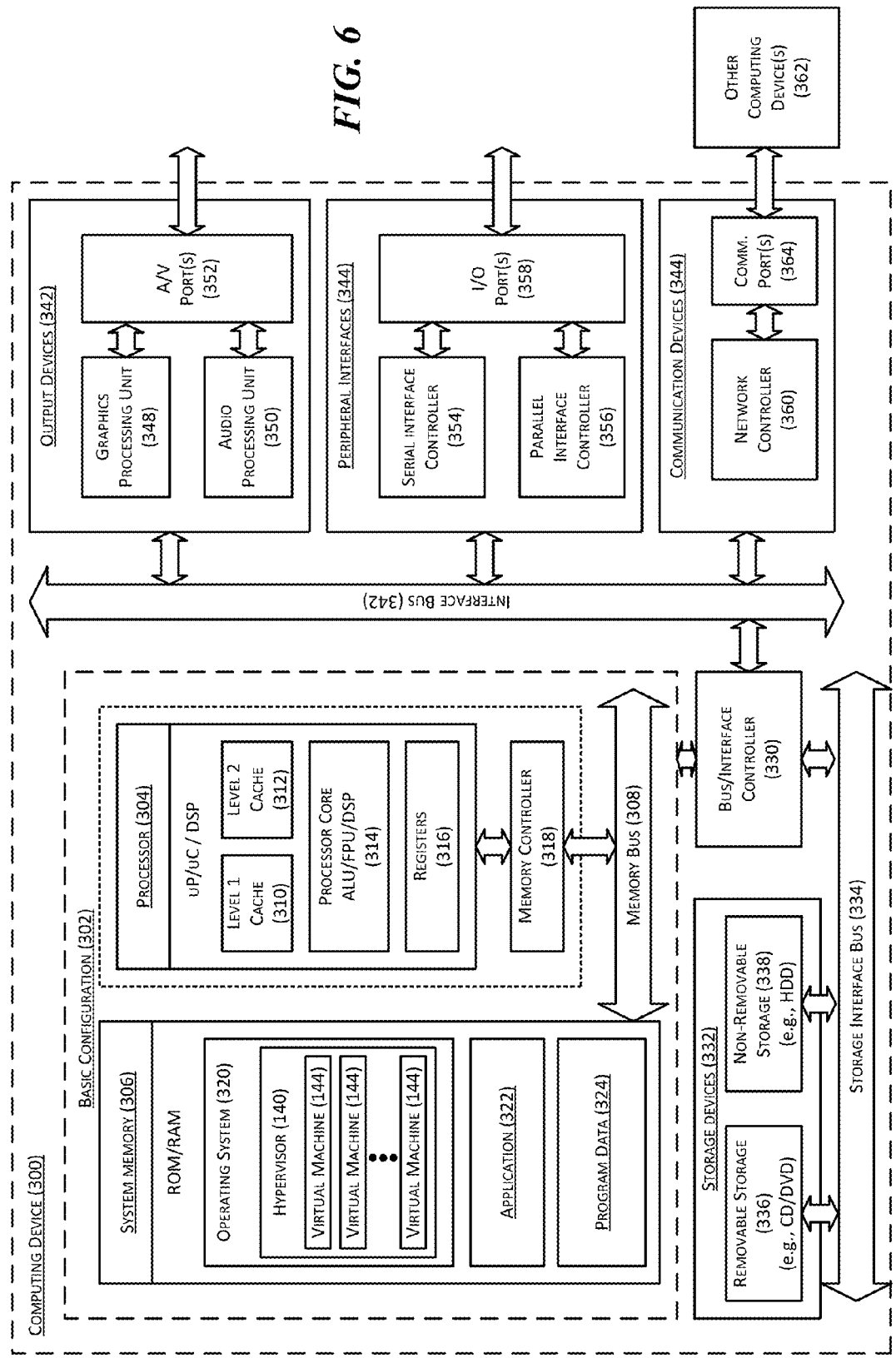
FIG. 6 is a computing device suitable for certain components of the cloud computing system in FIG. 1.

FIG. 6 is a computing device 300 suitable for certain components of the cloud computing system 100 in FIG. 1. For example, the computing device 300 can be suitable for the hosts 106 or the client devices 102 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations, memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

I claim:

1. A method of deploying cloud services in a cloud computing system having multiple computing facilities interconnected by a computer network, the method comprising:
    receiving a service request for deploying an application in the cloud computing system, the application including multiple cloud services each manageable by a corresponding service controller in the cloud computing system, at least one service being deployable in more than one of the computing facilities; and
    in response to receiving the service request,
        querying the service controllers for a list of the computing facilities arranged in order of preference by each of the service controllers for deploying one or more corresponding cloud services associated with the application;
        selecting a computing facility from the multiple computing facilities based on the preferences of the service controllers reflected in the lists of the computing facilities; and
        instructing the service controllers to deploy the cloud services associated with the application to the selected computing facility.

2. The method of claim 1 wherein querying the service controllers includes:
    transmitting a request containing data identifying the cloud services to be deployed by the individual service controllers; and
    receiving, from the individual service controllers, the list of the computing facilities arranged in order of preference based on a profile of the individual computing facilities.

3. The method of claim 1 wherein:
    receiving the service request includes receiving the service request identifying a co-location constraint between two or more of the cloud services; and
    selecting the computing facility includes:
        transmitting a bid request containing data identifying the cloud services to be deployed by the individual service controllers; and
        receiving, from the individual service controllers, the list of the computing facilities arranged in order of preference based on at least one of an available capacity or a capability of the individual computing facilities and the co-location constraint between two or more of the cloud services.

4. The method of claim 1 wherein:
    receiving the service request includes receiving the service request identifying a co-location constraint between two or more of the cloud services and a threshold degree to which the co-location constraint can be relaxed;
    the selected computing facility is a first computing facility; and
    selecting the computing facility includes relaxing the co-location constraint based on the threshold degree to select a second computing facility for deploying at least one of the cloud services associated with the application, the second computing facility being distinct from the first computing facility.

5. The method of claim 1 wherein selecting the computing facility includes:
aggregating the preferences in the lists from the service controllers to derive an overall preferred computing facility by all of the service controllers; and
selecting the computing facility includes selecting the overall preferred computing facility for deploying the cloud services of the application.

6. The method of claim 1 wherein:
each of the lists contains data representing a ranking of the computing facilities in order of preference;
selecting the computing facility includes:
for each list, assigning a numerical value to each of the computing facilities in the list based on the ranking of the corresponding computing facility;
summing the assigned numerical values for each computing facility to derive a total value for each of the computing facility; and
selecting a computing facility having the highest total value for deploying the cloud services associated with the application.

7. The method of claim 1 wherein selecting the computing facility includes filtering the lists of the computing facilities to eliminate one or more computing facilities not acceptable by at least one of the service controllers.

8. The method of claim 1 wherein:
the service controllers include a first service controller and a second service controller; and
selecting the computing facility includes applying a weighting factor to the list corresponding to the first service controller such that preference of the first service controller outweighs preference of the second service controller.

9. The method of claim 1, further comprising:
receiving a notice from one of the service controllers that a corresponding cloud service deployed to the selected computing facility is to be migrated to another one of the computing facilities; and
in response to receiving the notice,
querying the service controllers for a new list of the computing facilities arranged in order of preference by each of the service controllers for deploying one or more corresponding cloud services associated with the application;
selecting another computing facility from the multiple computing facilities based on the preferences of the service controllers reflected in the lists of the computing facilities; and
instructing the service controllers to migrate the cloud services associated with the application to the selected another computing facility.

10. A computing device, comprising:
a processor; and
a memory containing instructions executable by the processor to cause the processor to perform a process comprising:
receiving, via a computer network, a request for submission of preferences in deploying a cloud service in one of multiple computing facilities of a cloud computing system;
in response to receiving the request,
generating a list containing the computing facilities ranked based on a suitability for deploying the cloud service; and
transmitting, via the computer network, the generated list containing the ranked computing facilities;
receiving, via the computer network, an instruction to deploy the cloud service to one of the computing facilities in the transmitted list; and
in response to receiving the instruction, deploying the cloud service to the one of the computing facilities indicated in the instruction.

11. The computing device of claim 10 wherein generating the list containing the computing facilities includes generating the list containing the computing facilities based on an available capacity or a capability of the individual computing facilities for deploying the cloud service.

12. The computing device of claim 10 wherein receiving the instruction to deploy the cloud service includes receiving the instruction to deploy the cloud service to one of the computing facilities that is not a most preferred in the transmitted list.

13. The computing device of claim 10, further comprising:
detecting a failure in the one of the computing facilities to continue hosting the cloud service; and
in response to the detected failure, transmitting, via the computer network, a request to reinitiate a process to determine another computing facility for migrating the cloud service from the one of the computing facilities.

14. The computing device of claim 10, further comprising:
detecting a failure in the one of the computing facilities to continue hosting the cloud service; and
in response to the detected failure, transmitting, via the computer network, a request to reinitiate a process to determine another computing facility for migrating the cloud service from the one of the computing facilities and a new list containing ranked computing facilities without the one of the computing facilities.

15. The computing device of claim 10, further comprising:
detecting a failure in the one of the computing facilities to continue hosting the cloud service;
in response to the detected failure, transmitting, via the computer network, a request to reinitiate a process to determine another computing facility for migrating the cloud service from the one of the computing facilities;
receiving, via the computer network, another instruction to migrate the cloud service to another one of the computing facilities; and
in response to receiving the another instruction, migrating the cloud service from the one of the computing facilities to the another one of the computing facilities indicated in the another instruction.

16. The computing device of claim 10, further comprising:
while the cloud service is deployed normally on the one of the computing facilities,
receiving, via the computer network, another instruction to migrate the cloud service to another one of the computing facilities; and
in response to receiving the another instruction, migrating the cloud service from the one of the computing facilities to the another one of the computing facilities indicated in the another instruction.

17. A computing device for managing cloud services in a cloud computing system having multiple computing facilities interconnected by a computer network, the computing device comprising:

a processor; and a memory containing instructions executable by the processor to cause the processor to perform a process comprising:

transmitting, via the computer network, a request to individual service controllers configured to manage corresponding cloud services deployable in the cloud computing system, the request including a set of cloud services to be deployed in the cloud computing system;

receiving, from each of the service controllers, a list of at least some of the computing facilities arranged in order of preference by each of the service controllers for deploying one or more corresponding cloud services in the set of cloud services;

selecting one of the computing facilities from the multiple computing facilities for deploying the set of cloud services based on the preferences of the service controllers reflected in the received lists; and instructing, via the computer network, the service controllers to deploy the one or more corresponding cloud services to the selected one of the computing facilities.

18. The computing device of claim 17, further comprising:

receiving, via the computer network, a request from one of the service controllers requesting selection of another one of the computing facilities for deploying at least one of the cloud services; and in response to receiving the request from one of the service controllers, transmitting, via the computer network, another request individually to all of the service controllers for a new list of computing facilities arranged in order of preference.

19. The computing device of claim 17 wherein the process further comprises:

receiving, via the computer network, a request from one of the service controllers requesting selection of another one of the computing facilities for deploying at least one of the cloud services; and in response to receiving the request from one of the service controllers, transmitting, via the computer network, another request individually to all of the service controllers for another list of computing facilities arranged in order of preference;

receiving, from each of the service controllers, another list of at least some of the computing facilities arranged in order of preference by each of the service controllers for deploying one or more corresponding cloud services in the set of cloud services;

selecting another one of the computing facilities from the multiple computing facilities for deploying the set of cloud services based on the preferences of the service controllers reflected in the received lists; and instructing, via the computer network, the service controller from which the request is received, to deploy the at least one cloud service to the selected another one of the computing facilities.

20. The computing device of claim 17 wherein selecting one of the computing facilities includes:

for each received list, assigning a numerical value to each of the computing facilities in the list based on a ranking of the corresponding computing facility;

summing the assigned numerical values for each computing facility to derive a total value for each of the computing facility; and selecting the one of the computing facilities having the highest total value for deploying the set of cloud services.

\* \* \* \* \*